Dec. 12, 1967  D. G. FAWKES  3,357,269
VALVE OPERATOR
Filed May 25, 1966

INVENTOR
DONALD G. FAWKES
BY Hofgren, Wegner, Allen,
Stellman & McCord.
ATTORNEYS

United States Patent Office 3,357,269
Patented Dec. 12, 1967

3,357,269
VALVE OPERATOR
Donald G. Fawkes, Chicago, Ill., assignor to Henry Pratt Company, a corporation of Illinois
Filed May 25, 1966, Ser. No. 552,783
7 Claims. (Cl. 74—89.15)

This invention relates to an operating mechanism for a valve and particularly to a valve operator for valves having a closure requiring about 90° of valve shaft turning between open and closed positions.

Such valves as cone, rotary, and butterfly have a shaft upon which the valve closure is mounted within a valve body and intended to turn with the shaft approximately 90° between its fully open and fully closed positions. A crank may be attached to the valve shaft outside of the valve body and may be turned by hand or by various available motors in order to accomplish the 90° of movement or increments thereof. The present valve operator is intended to be secured to a valve housing with a mechanism connected to the valve shaft to effect movement of the valve closure in the prescribed manner translating a straight line force and motion into 90° of rotary motion of the shaft.

The principal object of this invention is to provide a new and improved valve operator of the character described.

Another object of the invention is to provide an operator of simplified parts and which has a sliding connection between an axially movable operating member and a rotatable member fixed to the valve shaft.

Another object is to provide an improved motion translating coupling in valve operator of the type described.

A further object is to provide a valve operator structure adaptable readily for use with different power sources and of a structure simplifying installation of the operator upon a valve.

Other objects, features and advantages of the present invention will be apparent from the following description of a preferred embodiment illustrated in the accompanying drawings, in which.

Figure 1:
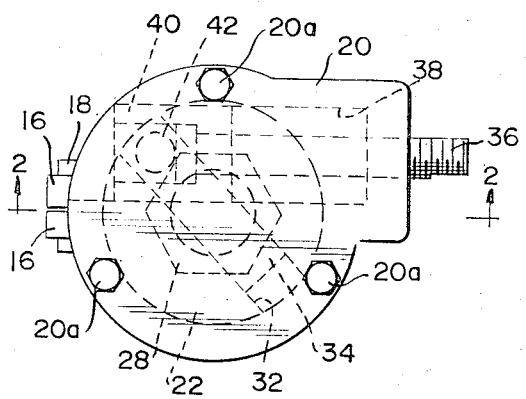
FIGURE 1 is a top plan view of the valve operator of this invention.

The valve operator of the present invention may be placed on various types of valves as earlier mentioned, and includes a two-piece housing comprising a lower piece 12 clamped to the outside diameter of a valve shaft trunnion 14. The lower housing piece 12 may include radially disposed ears 16 having a bolt 18 extending therethrough for clamping the housing piece 12 securely to the valve shaft trunnion 14. The housing has an upper housing piece 20 which acts also as a cover secured to the top of the lower housing piece 12 by bolts 20a.

Figure 2:
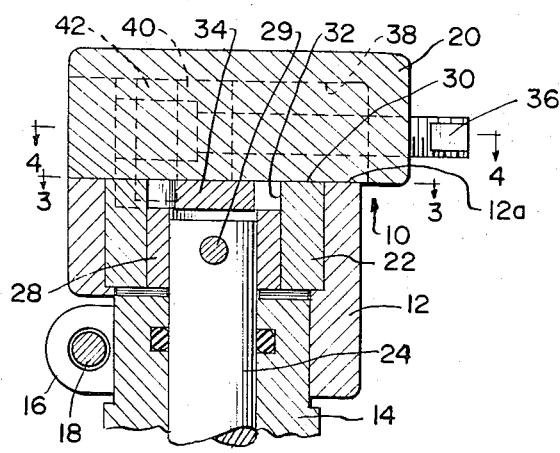
FIGURE 2 is a vertical fragmentary sectional view through the valve operator taken substantially along the line 2—2 in FIGURE 1.

A rotatable member or collar 22 is disposed in the lower housing piece 12 and receives the upper end of valve shaft 24 and is fixed thereto to insure turning of the valve shaft and the rotatable collar 22 together about the axis of the valve shaft. In the embodiment illustrated, the interior of the collar is serrated as at 26 and receives a hex shaped coupling nut 28 which is pinned to the valve shaft by pin 29 (FIG. 2). The collar 22 has an upper flat end wall 30 substantially on the same elevation as the upper end 12a of the lower housing part 12. An elongate slot or slideway 32 is disposed across the collar transverse the axis of the valve shaft 24 and disposed so that the center of the slideway crosses the valve shaft center line. The slot is rectangularly shaped in section and has side walls against which a force transmitting slide member 34 may bear to force rotation of the collar and thus the valve shaft between open and closed positions of a valve closure member (not shown) which is secured to the valve shaft.

Figure 3:
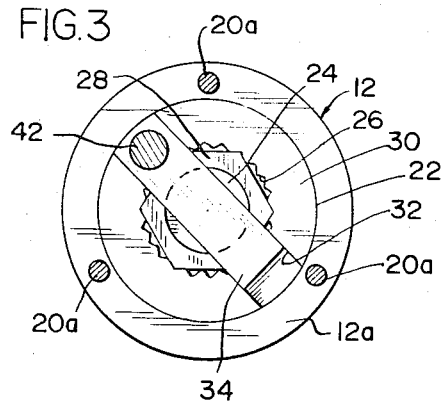
FIGURE 3 is a horizontal sectional view taken substantially along the line 3—3 of FIGURE 2.
Figure 5:
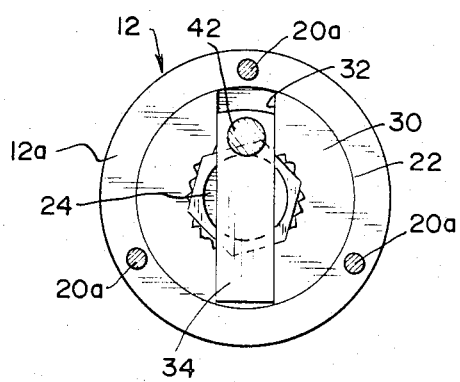
FIGURE 5 is a view similar to that of FIGURE 3 showing the valve operator in an increment of its 90° movement.

The force transmitting slide member 34 is an elongated steel bar disposed in the slideway 32 with sufficient clearance to permit free movement of the slide member in the slideway for imparting rotary movement to the collar 22 and valve shaft 24. FIGURE 3 shows the slide member 34 in a position corresponding to valve closed position and FIGURE 5 shows the slide member in a position half way between open and closed positions of the 90° rotatable closure member.

The upper housing part 20 contains mechanism for imparting motion to the slide member 34. An operating rod 36 is mounted in the upper housing piece 20 for axial movement in the direction of arrow A (FIG. 4) in a path adjacent to and at an angle to the slideway 32 as well as being transverse to and spaced from the axis of the valve shaft 24. In the embodiment illustrated, the operating rod 36 is threaded into the upper housing wall 20b so that turning the rod about its own axis advances or retracts the rod into and out of the housing along such axis. A crank, a wheel, a lever or a motor may be secured to the rod outside of the housing for turning the operating rod 36 resulting in such axial movement. The operating rod 36 extends into a second slot or slideway 38 generally parallel to the rod in the upper housing piece 20. This slideway receives a slide block 40 which is journalled to the innermost end of the operating rod in such a manner that the rod may rotate in the direction of arrow B (FIG. 4) while imparting rectilinear movement to the slide block 40 in the direction of arrow A within the slideway 38. A pivot pin 42 provides a means connecting the slide block 40 to the force transmitting slide member 34. The slide block 40 is confined to rectilinear movement in the slideway 38 and the slide member 34 to movement lengthwise of the slideway 32, the pivot pin permitting both blocks to move together simultaneously in their respective slideways.

Figure 4:
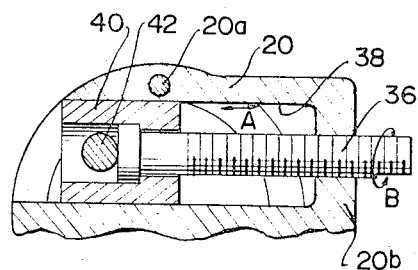
FIGURE 4 is a horizontal fragmentary sectional view taken substantially along the line 4—4 in FIGURE 2.

In operation, axial movement is imparted to the operating rod 36 which in turn moves the slide block 40 back and forth within the slideway 38 in the upper housing piece 20. The slide block 40 moves rectilinearly in a path across the slideway 32 and collar 22 transverse to and spaced from the axis of the valve shaft and acts through pivot pin 42 to cause the slide member 34 to bear against the side walls of the slideway 32 in collar 22. The slide member 34 moves within slideway 32, as illustrated in FIGURES 3 and 4, to transmit rotary force to the collar 22 thus imparting rotary movement to the valve shaft 24.

Butterfly valves are common in sizes from 3 inch diameter up to several feet in diameter. The present operator is intended for use with a range of sizes of the smaller valves. The installation of the present operator upon butterfly valves, or any other types of 90° movement valves having a valve shaft trunnion, is made quite easy since the operator clamps directly to the outside of the trunnion. The collar 22 may be rotatively positioned in many positions relative to the valve since it is equipped with the serrations mentioned to receive the nut on the valve shaft in many positions. Much latitude is thus provided for mounting the operator rod 36 in a desired location relative to the valve itself. The mechanism of the force transmission operates, as described above, with any straight-line input of force thus permitting use of known power sources such as piston and cylinders where the rod 36 would slide through the housing rather than be threaded. The unit is compact and lends itself to precision casting and die casting of parts. The unit provides economy in the small valve operator field.

The foregoing detailed description has been given for clearness of understanding only and no unnecessary limitations are to be understood therefrom, for some modifications will be obvious to those skilled in the art.

I claim:

1. An operator for a valve having a closure requiring approximately 90° of valve shaft turning between open and closed positions, comprising: a housing secured to the valve in a position to receive one end of the valve shaft therein; a rotatable member disposed within the housing and secured to the valve shaft in a manner insuring turning of the valve shaft and rotatable member together about the axis of the valve shaft, the rotatable member having means forming a slideway disposed radially of the axis of said valve shaft; a force transmitting member slidably received within the slideway in a manner permitting free movement of the force transmitting member therein in a radial direction to the axis of said valve shaft while imparting rotary movement to said rotatable member and valve shaft; an operating rod journalled in said housing for axial movement in a path adjacent said slideway transverse to and spaced from the axis of said valve shaft; and means connecting said operating rod to said force transmitting member in a pivotal manner so that axial movement of said operating rod causes said force transmitting member to move in said slideway and impart rotary movement to said rotatable member and said valve shaft.

2. The valve operator of claim 1 wherein said rotatable member comprises a collar fixed to and embracing one end of said valve shaft and has means defining an end wall portion in which said slideway is disposed.

3. The valve operator of claim 2 wherein said operating rod moves in a straight line path adjacent the end wall portion of said collar at an angle to the direction of length of slideway therein and spaced radially from the axis of said valve shaft.

4. The valve operator of claim 1 wherein said rotatable member comprises a collar having means defining an end wall portion over the end of the valve shaft in which said slideway is disposed and wherein said housing includes an elongate slideway adjacent the end wall portion of said collar spaced radially from the axis of said valve shaft and at an angle to the slideway in said collar, a sliding block is disposed in the elongate slideway in said housing and connected to said operating rod.

5. The valve operator of claim 4 wherein a pivot pin extends through said sliding block and said slide member pivotally connecting the block to the slide member.

6. The valve operator of claim 4 wherein said operating rod comprises a screw threaded member threaded into a portion of said housing and said sliding block is journalled on the inner end of said operating rod in a manner guiding the operating rod in axial movement with the sliding block while permitting rotation of the screw member relative to said block.

7. A valve operator for a valve requiring about 90° of valve shaft turning motion, comprising: a housing having a rotatable member therein for receiving one end of the valve shaft in a manner insuring turning of the valve shaft and rotatable member together about the axis of the valve shaft, the rotatable member having a slideway disposed radially of the axis of said valve shaft; a force transmitting member disposed in the slideway in a manner permitting free movement of the force transmitting member radially of said valve shaft for imparting rotary movement to said rotatable member and valve shaft; and means mounted in the housing for applying straight line force to said transmitting member in a direction transverse to and spaced from the axis of said valve shaft.

References Cited

UNITED STATES PATENTS 2,712,242   7/1955   Davis _____ 74—104 XR

FRED C. MATTERN, Jr, *Primary Examiner.*

F. D. SHOEMAKER, *Assistant Examiner.*

Disclaimer 3,357,269.—*Donald G. Fawkes*, Chicago, Ill. VALVE OPERATOR. Patent dated Dec. 12, 1967. Disclaimer filed Apr. 14, 1969, by the assignee, *Henry Pratt Company*.

Hereby enters this disclaimer to claim 7 of said patent.

[*Official Gazette May 27, 1969.*]